United States Patent [19]

Franks et al.

[11] 4,089,208
[45] May 16, 1978

[54] PRESSURE TEST FIXTURE FOR PRESSURIZED CONTAINERS

[75] Inventors: Nelson J. Franks, Lambertville, Mich.; Thomas W. Gray, Toledo; Ralph H. Whitney, Whitehouse, both of Ohio

[73] Assignee: Owens-Illinois, Inc., Toledo, Ohio

[21] Appl. No.: 757,766

[22] Filed: Jan. 7, 1977

[51] Int. Cl.² ............................................. G01M 3/06
[52] U.S. Cl. ..................................... 73/45.5; 73/49.3
[58] Field of Search ................ 73/40, 45.5, 49.2, 49.3, 73/52

[56] References Cited

U.S. PATENT DOCUMENTS

| 900,324 | 10/1908 | Swangren | 73/49.3 |
| 1,042,558 | 10/1912 | Karp | 73/45.5 |
| 3,958,448 | 5/1976 | Willis | 73/52 |

*Primary Examiner*—S. Clement Swisher
*Attorney, Agent, or Firm*—Alan J. Steger; E. J. Holler

[57] ABSTRACT

Apparatus for testing pressurized sealed containers for leakage including a fluid filled tank for receiving the container to be tested. The tank is comprised of a transparent side wall, a bottom wall and a top wall. Means are provided for piercing the container to be tested. Means are further provided for attachment to the piercing means for providing communication between the interior of the container and a source of pressure fluid operable to pressurize the container being tested only when the top wall of the tank is in a closed position.

8 Claims, 4 Drawing Figures

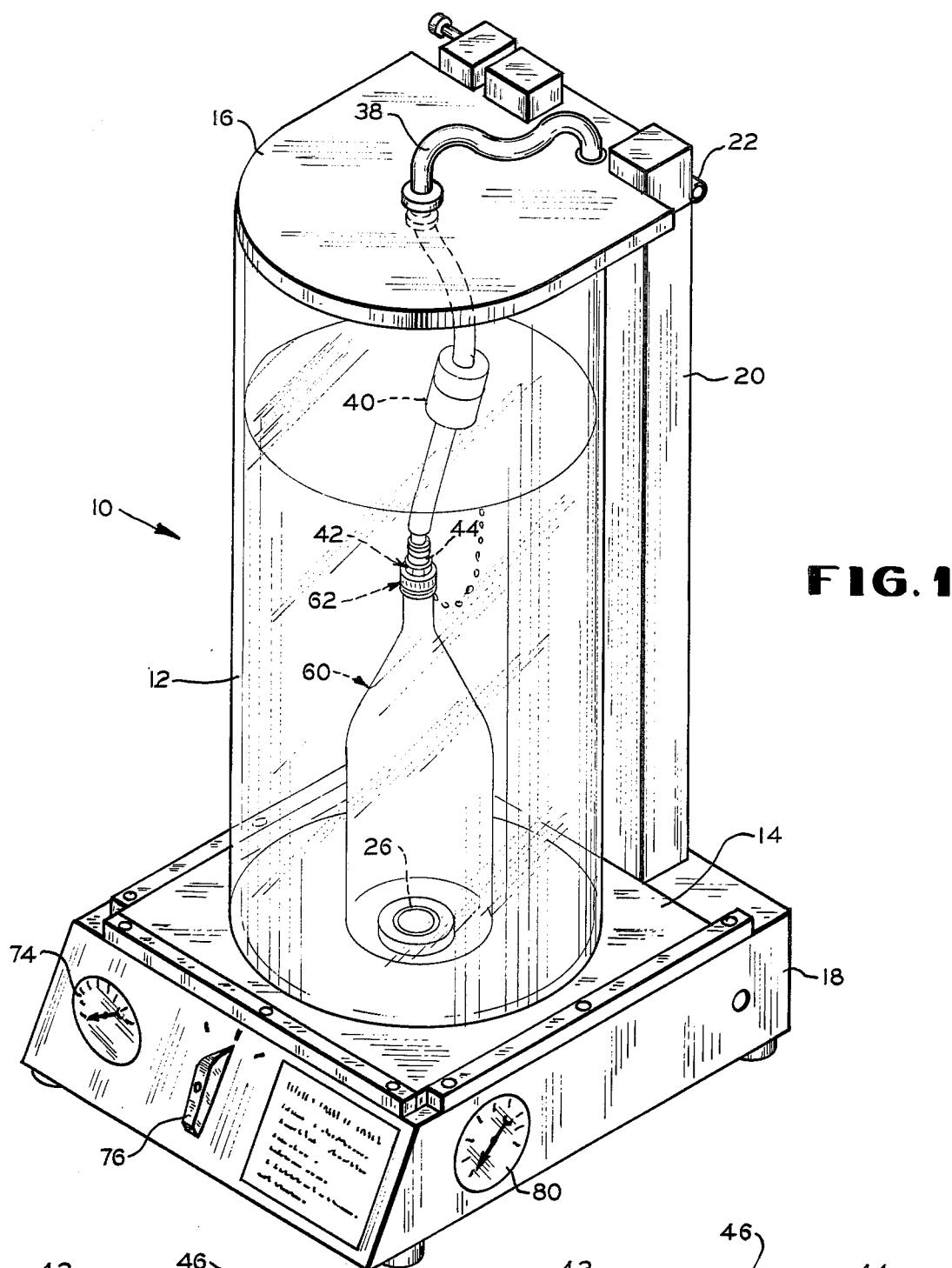
FIG. 1
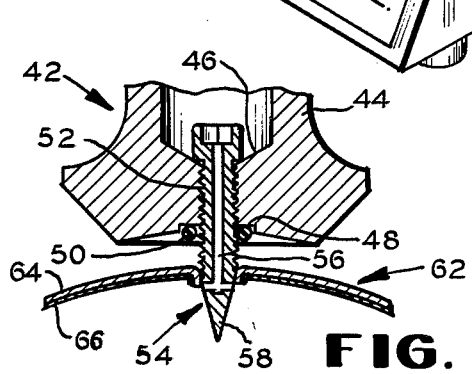
FIG. 3
FIG. 4

PRESSURE TEST FIXTURE FOR PRESSURIZED CONTAINERS

BACKGROUND OF THE INVENTION

1. Field of the Invention

The invention relates to apparatus for testing sealed containers which requires no change of parts to adapt the same to test containers of different configurations and sizes to assure the closures having been securely applied to effect the desired closure-to-container relationship.

2. Description of the Prior Art

Attempts have been made to test the integrity and effectiveness of the seals of containers for foods and beverages. However, by introducing a pressurized fluid to the interior of the container when internal pressures have exceeded the inherent strength of the container being tested, explosions have occurred causing bodily injury and damage to adjacent property. In such instances, the fragments of the damaged container have been considerably dispersed and further fractured, increasing the problem of reassemblage of the container to study the cause of failure. Also, the prior art apparatus have generally required change-over mechanisms to be used to adapt the apparatus to accommodate the testing of containers of various sizes and Manifestly, there is presently a need to produce apparatus for rapidly, economically, and safely testing the seal of a variety of sizes and configurations of containers used particularly in the food and beverage industry.

SUMMARY OF THE INVENTION

Apparatus incorporating the features of the present invention can be readily and safely utilized for testing containers of a wide range of shapes and sizes; provides for safety to the operator; enables the visual examination of leaks in the container; and contains an integral interlocking mechanism preventing pressurization of the container under test until the enclosing tank is completely closed, and depressurizing the apparatus at completion of test.

The method of practicing the invention includes the initial step of piercing the container to be tested with a pressurizing fixture to establish a sealed relationship between the fixture and the container. The container is then placed in the associated tank which is filled with a suitable liquid, such as water, for example. The tank is next closed and simultaneously a pressurized fluid path is established between a source of pressure fluid and the interior of the container being tested through the pressurizing fixture. The delivery of pressure fluid to the interior of the container is commenced and continued until bubbles emerge and visually pass upwardly in the liquid contained within the outer tank; or until a predetermined test pressure level is reached; or until complete destruction of the container under test occurs.

It is an object of the invention to produce an apparatus for pressure testing containers adaptable to a wide range of sizes and shapes.

Another object of the invention is to produce an apparatus for pressure testing containers, the apparatus having an integral safety interlocking mechanism preventing the introduction of pressure fluid into the container under test until the associated tank is safely in a closed condition.

Another object of the invention is to produce an apparatus which may be economically manufactured and utilized to achieve the desired testing procedures.

Still another object of the invention is to produce an apparatus for testing sealed containers which may be effectively and safely employed by persons with no special training.

The objects and advantages of the invention may be achieved by an apparatus comprising a tank for receiving a container to be tested which tank includes a side wall, a bottom wall, and a top wall, wherein the top wall is selectively openable to provide access to the interior of the tank; a pressurizing fixture for piercing the container being tested to provide communication with the interior of the container; and means providing communication between a source of pressure fluid and the pressurizing fixture, wherein the means includes valve means interlocked with the top wall of the tank to couple the source to the pressurizing fixture, when the top is in a closed position with respect to the side wall of the tank.

The above and other objects and advantages of the invention will become clearly apparent to those skilled in the art from reading the following detailed description of an embodiment of the invention when considered in the light of the accompanying drawings.

BRIEF DESCRIPTION OF THE DRAWINGS

FIG. 1 is a perspective view of an apparatus incorporating the features of the invention.

FIG. 3 is an enlarged fragmentary sectional view of the pressurizing fixture illustrated in FIGS. 1 and 2 showing the fixture as it initially pierces the container being tested; and FIG. 4 is a view similar to FIG. 3 showing the pressurizing fixture in its final seated position ready for pressurization of the associated container.

DESCRIPTION OF PREFERRED EMBODIMENT

Figure 2:
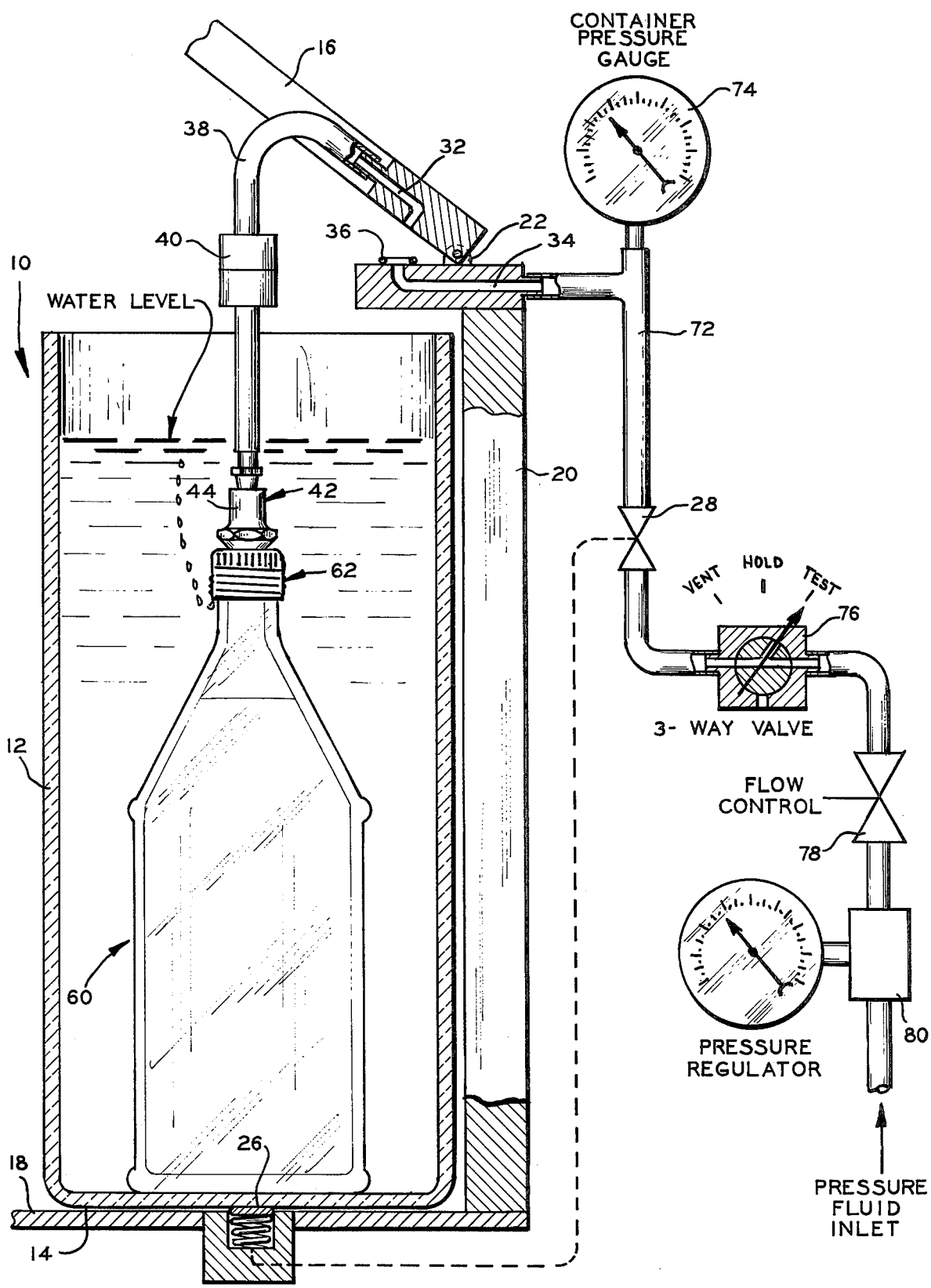
FIG. 2 is an elevational side view of the apparatus illustrated in FIG. 1 with certain portions cut-away to more clearly illustrate the structure and showing the associated fluid pressure lines and valving in a somewhat diagrammatic fashion.

FIGS. 1 and 2 illustrate apparatus constructed in accordance with the teachings of the invention wherein there is shown a container receiving outer housing or tank 10 preferably formed of a transparent plastic material such as for example acrylic resin. The tank 10 includes a side wall 12, bottom wall 14, and top wall or cover 16. It must be understood that a number of materials may be employed for forming the tank 10, but the material should preferably be able to contain a liquid such as water and have sufficient strength to resist penetration by fragments of an exploding container. While it is generally considered preferable to use a transparent material for forming the side wall 12, stainless steel could be used in instances where it was not deemed necessary to view the test through the side wall.

The tank 10 is supported by a base 18. Extending upwardly from the rear of the upper surface of the base 18 is a columnar member 20. The cover 16 of the tank 10 is hingedly mounted by hinge means 22 to the upper portion of the columnar member 20 so as to permit ready access to the interior of the tank.

The base 18 contains a button 26 for actuating a normally closed valve 28 in series with a source of pressure fluid (not shown). When the bottom wall 14 of the tank 10 is properly positioned on the base 18 the button 26 is suitably depressed to open the valve 28.

The top cover 16 is provided with an internal passageway 32 which communicates with the interior of the tank 10 when the cover is closed. Extending inwardly from the upper portion of the columnar member 20 in the region of the hinge means 22 is a section of the member 20 having an internal passageway 34. An O-ring 36 is positioned to surround the terminal outlet end of the passageway 34. It will be observed upon examining FIG. 2 that the internal passageways 32 and 34 are formed so as to communicate with one another when the top 16 is in a closed position. In such closed position, the O-ring 36 forms a fluid - tight seal between the lower surface of the top 16 and the upper cooperating surface of the associated column member 20 and completely surrounds the junction of the passageways 32 and 34.

Extending from the opposite end of the passageway 32 is a pressure line or hose 38 which terminates within the interior of the tank 10 in one end of a quick-disconnect coupling 40. The other end of the coupling 40 is coupled to a pressurizing fixture 42 illustrated in some detail in FIGS. 3 and 4.

With reference particularly in FIGS. 3 and 4, there is shown the pressurizing fixture 42 which consists of a main body portion 44 typically having its outer peripheral surface outwardly flanged adjacent its lower end to facilitate the piercing action as will be explained. A centrally disposed passageway 46 extends through the main body 44 and terminates in an enlarged annular recess 48 which receives a suitably sized O-ring 50. The passageway 44 has internally formed threads for threadably receiving an externally threaded shank 52 of a hollow gimlet-like piercing attachment 54. The piercing attachment 54 further includes a centrally disposed bore 56 and a container wall piercing nose 58.

While the present invention lends itself to the testing of a variety of types, configurations, and sizes of sealed containers, it has been found that the apparatus is particularly useful in testing and detecting abnormalities in the closure-to-container relationships in containers of the type utilized for carbonated beverages wherein the containers 60 typically have spin-top closures 62. The spin-top 62 is roll-formed and is provided with an outer shell 64 of metal having a slightly convex upper portion and a depending skirt portion with threads rolled therein for threaded engagement with the external threads formed on the neck of the container 60. A suitable layer 66 of sealing gasket material underlays the inner surface of the closure outer shell 64.

In attaching the pressurizing fixture 42 to the container 60, it is preferred that the actual attachment is made prior to the placement of the container 60 into the test tank 10. Initially, the pressurizing fixture 42 is grasped by hand and downward force is applied to the outwardly flange portion of the fixture. The piercing nose 58 of the piercing attachment 54 is thereby forced against and is caused to puncture the closure 62 by initially piercing the metal wall of the outer shell 64 and thence the inner sealing gasket layer 66. The gas present in the headspace of the container 60 escapes out through the channel or bore 56. After the pressure within the container 60 is equalized, the pressurizing fixture 42 is rotated with downward pressure so that the threads of the threaded shank portion 52 form matching threads in the pierced hole in the outer shell 64 and the sealing gasket 66 of the spin-top closure 62. The rotation of the fixture continues until the O-ring 50 is seated in gas-tight sealing relation with the outer surface of the closure 62 around the aperture formed therein by the piercing attachment 54 of the pressurizing fixture 42.

It will be observed that the pressurizing fixture 42 has effected communication with the interior of the container 60 to be tested. Now, the quick-disconnect coupling 40 is coupled to the pressurizing fixture 42 and the container 60 is inserted into the tank 10 which has been previously filled with a suitable quantity of water. Once the container 60 is completely immersed in the water with in the tank 10 and properly seated against the inner surface of the bottom wall 14, the top or cover 16 can be closed to thereby effectively close the interlock mechanism creating a pressure line of communication between a source of pressure fluid (not shown) and the interior of the container 60 being tested. More specifically, as the cover 16 is swung about the hinge 22 and brought to a fully closed position, the passageways 32 and 34 become aligned with one another and are sealed about their interface by the O-ring 36.

The source of pressure fluid is coupled to the system herein-above described through suitable pressure lines and valving somewhat diagrammatically illustrated in FIGS. 1 and 2. The passageway 34 is suitably coupled to the normally closed valve 28 through a pressure line 72. A suitable container pressure gauge 74 is coupled to the line 72 to constantly monitor the fluid pressure of the system. Further, and in series arrangement, there is a three-way selector valve 76, a flow control valve 78, and a pressure regulator 80. The three-way valve 76 has the three positions — VENT, HOLD, and TEST as will be explained in detail hereinafter with reference to the description of the operation of the system.

The operation of the apparatus described in the foregoing is commenced by initially filling the clear plastic tank 10 with a sufficient amount of water, generally to prescribed indicia appearing on the side wall thereof. The filled tank 10 is then placed on the supporting plate 24 of the base 18 so as to depress the button 26 which will open the normally closed valve 28. Next, the pressurizing fixture 42 is attached to container 60 being tested, by piercing the center portion of the closure 62 with the piercing nose 58 thereof. When resistance is sensed by the operator, a continued downward pressure is applied to the fixture while simultaneously rotating the fixture in a clockwise direction. The threaded portion of the threaded shank 52 immediately adjacent the piercing nose 58 will thread into the pierced hole of the closure 62, and in effect create a series of cooperating threads. Further rotation of the fixture 42 is continued until such resistance is sensed to indicate that the associated O-ring 50 is in a seated conditon. It is not necessary to over tighten the fixture 42, since the O-ring 50 around the threaded shank 52 will effect a tight seal.

Next, the container 60 is partially immersed in the water contained in the tank 10, the quick disconnect coupling 40 is coupled together, and the container is positioned to bottom rest against the bottom 14 of the tank 10. Then the cover 16 is closed causing the O-ring 36 to provide an annular seal around the interface between the passageways 32 and 34, thereby creating completed circuit to the source of pressure fluid.

The container pressure gauge 74 is properly reset to zero. The three-way selector valve 76 is then rotated to the "TEST" position, thereby permitting the pressure fluid to flow through the test valve, communicates with the pressure gauge 74, and thence into the container 60 under test. The pressure indicated by the container pressure gauge 74 is carefully observed until the pressure reaches 175 pounds per square inch for glass containers or 165 pounds per square inch for plastic containers. In the event bubbles are observed flowing upwardly from the juncture of the closure 62 and the container 60 before the critical pressure level is reached, the container is considered not to have a secure and acceptable seal. At this point the three-way selector valve 76 is rotated to a "HOLD" position. In the "HOLD" position, in the event of an improper seal, the container gauge 74 should be recorded at the point at which bubbles occurred in the water in the tank 10.

If no bubbles are observed, and the pressure indicated in the pressure guage 74 has reached the desired pounds per square inch, a secure and acceptable seal is indicated. In such event, the three-way selector valve 76 is rotated to a "VENT" positon allowing the container under test to vent to the atmosphere and causing the pressure guage 74 to return to a "0" (zero) reading. At this point, the cover 16 on the tank 10 is unlatched and lifted to an open position, and the container 60 is removed from the water. Upon removal of the contaner 60 from the water in the tank 10, the quick-disconnect coupling 40 is actuated to disconnect the pressure line from the pressurizing fixture 42 allowing a complete removal of the container from the tank 10.

Finally, the pressurizing fixture 42 is rotated in a counter-clockwise direction permitting the removal thereof from the closure 62 of the container 60, thus completing the test cycle.

It will be appreciated from the method of and apparatus for testing pressurized containers described above that the invention has produced methods and means for such testing which may be economically and efficiently used by relatively unskilled operators to continuously monitor packaging operations to assure the closure has been securely applied to the containers and promptly detect abnormalities in the closure-to-container relationships.

What we claim is:

1. Apparatus for pressure testing containers subsequent to the containers being filled and sealed comprising:
    a tank for receiving the container to be tested, said tank including a side wall, bottom wall, and a top wall, the top wall being selectively openable to provide access to the interior of said tank;
    a pressurizing fixture for piercing the container being tested, and thereby providing communication with the interior of the container, said fixture including a piercing nose portion and a threaded shank portion associated therewith for forming a threaded engagement with the pierced container; and
    means providing communication between a source of pressure fluid and said pressurizing fixture.

2. The invention defined in claim 1 wherein said pressurizing fixture includes a main body portion and a shoulder portion flaring outwardly from said main body portion to assist in the manual manipulation thereof.

3. Apparatus for pressure testing containers subsequent to containers being filled and sealed comprising:
    a tank for receiving the container to be tested, said tank including a side wall, bottom wall, and a top wall, the top wall being selectively openable to provide access to the interior of said tank;
    a pressurizing fixture for piercing the container being tested, and thereby providing communication with the interior of the container; and
    means providing communication between a source of pressure fluid and said pressurizing fixture, said means including valve means interlocked with the top wall of said tank to couple said source to said pressurizing fixture when the top is in a closed position with respect to the side wall of said tank.

4. The invention defined in claim 3 wherein said pressurizing fixture includes a piercing nose portion and a threaded shank portion associated therewith for forming a threaded engagement with the pierced container.

5. The invention defined in claim 4 wherein said pressurizing fixture includes sealing means for effecting a pressure fluid-tight seal between said fixture and the pierced container.

6. The invention defined in claim 3 wherein said valve means includes a first passageway movable with said top wall, and a second passageway in fixed relation with respect to said side wall and alignable with said first passageway when said top wall is in a closed position.

7. The invention defined in claim 6 including pressure fluid sealing means at the juncture of said first and second passageways.

8. The invention defined in claim 3 wherein said side wall is formed of an optically transparent material.

* * * * *